Figure 1:
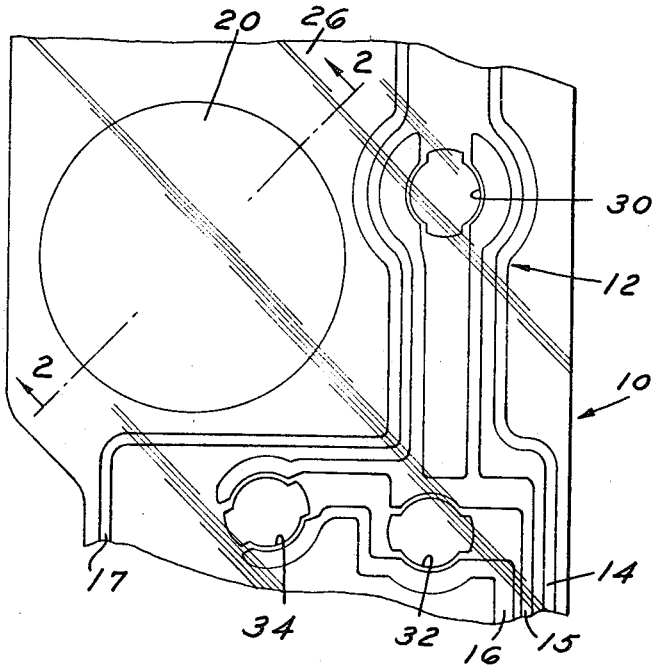
Figure 2:
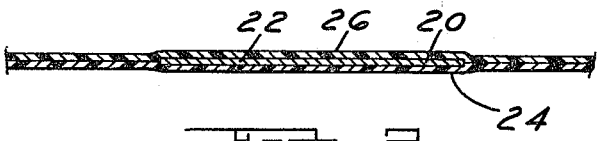
Figure 3:
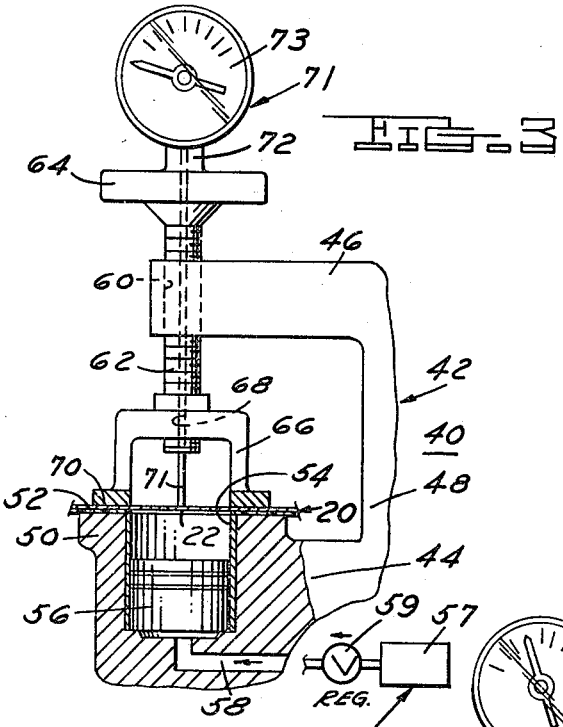
Figure 4:
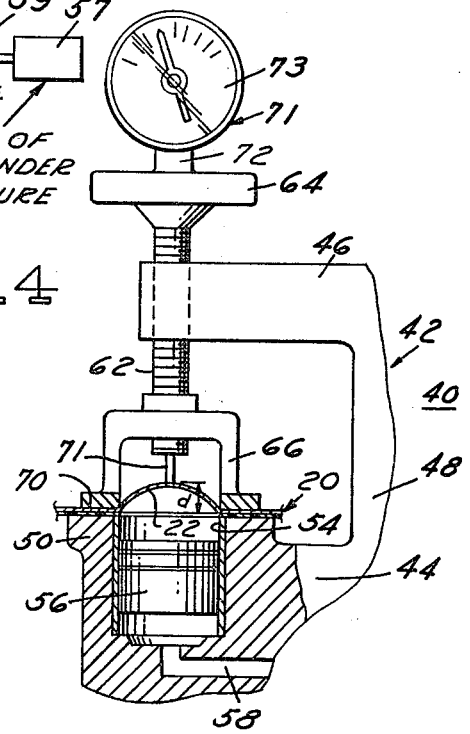

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 10, 1970

872 O.G. 357

T872,002

PRINTED CIRCUIT TEST PATCH AND METHOD OF NONDESTRUCTIVE TESTING OF THE PRINTED CIRCUIT MATERIAL

Douglas C. Long, Franklin, Mich., assignor to Ford Motor Company, Dearborn, Mich., a corporation of Delaware

Filed July 2, 1968, Ser. No. 741,965
**Int. Cl. C01n *3/28***
U.S. Cl. 73—102
2 Sheets Drawing. 14 Pages Specification

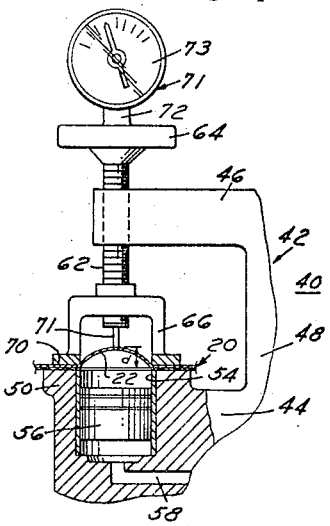

A printed circuit test patch for a flexible printed circuit that is suitable for use in an automotive vehicle and a method for testing the physical properties of the thin flexible conductive material of the printed circuit test patch without destruction of the printed circuit. A flexible printed circuit comprises a sandwich of a thin conductive material, preferably copper foil, which forms the circuit and thin plastic base and cover layers, preferably comprised of a polyester film which protects the thin flexible conductive material forming the circuit. In this circuit a test patch is attached which is comprised of precisely the same material that forms the thin conductive flexible material, such as copper foil, and this test patch may or may not be covered with the two layers of plastic material referred to above.

In the testing of the thin flexible conductive material, the test patch is removed without destroying the printed circuit. The layers of thin plastic material are removed and the test patch is placed in a testing machine which will measure the ductility of the thin flexible conductive material of the printed circuit by measuring its elongation properties. A maximum indicating deflectometer having a probe in contact with the material measures the elongation of the thin flexible conductive material as it is subjected to fluid under pressure in the testing machine. The thin flexible material may or may not be carried to the point of rupture and the maximum indicating deflectometer indicates the distance between the conductive material of the patch prior to the application of the hydraulic pressure and the center of a bulge created when the flexible conductive material is subjected to this pressure. This distance may be correlated by suitable mathematical formulas to the elongation and ductility of the conductive material of the test patch and hence the thin conductive flexible material or copper foil of the printed circuit.

March 10, 1970 D. C. LONG T872,002

PRINTED CIRCUIT TEST PATCH AND METHOD OF NONDESTRUCTIVE TESTING OF THE PRINTED CIRCUIT MATERIAL

Filed July 2, 1968 2 Sheets-Sheet 1

INVENTOR
DOUGLAS C. LONG
BY
John R. Faulkner
Keith L. Zerschling
ATTORNEYS

March 10, 1970 D. C. LONG T872,002

PRINTED CIRCUIT TEST PATCH AND METHOD OF NONDESTRUCTIVE TESTING OF THE PRINTED CIRCUIT MATERIAL

Filed July 2, 1968 2 Sheets-Sheet 2

INVENTOR
DOUGLAS C. LONG
BY
John R. Faulkner
Keith L. Zerschling
ATTORNEYS